Nov. 8, 1932.   A. N. MERLE   1,887,103
MEANS FOR ATTACHING LENSES TO CAMERAS
Filed March 15, 1932
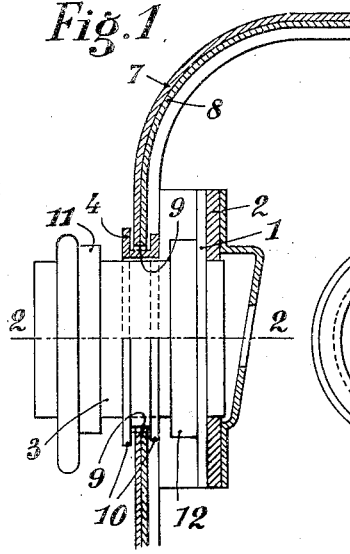
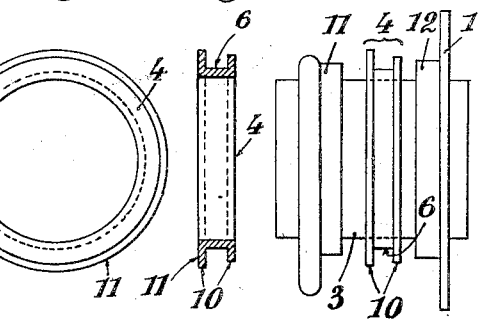
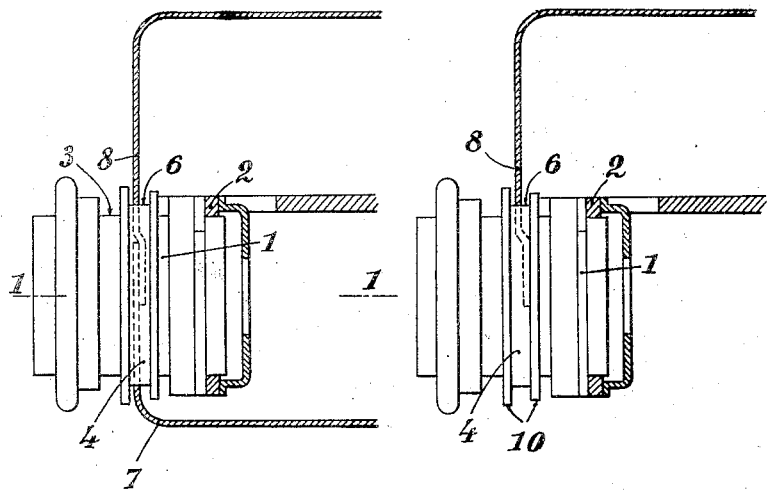
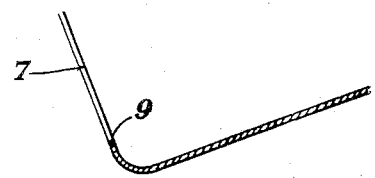
André Noël Merle
INVENTOR;

Patented Nov. 8, 1932

1,887,103

UNITED STATES PATENT OFFICE

ANDRÉ NOËL MERLE, OF VINCENNES, FRANCE, ASSIGNOR TO PATHE CINEMA, ANCIENS ETABLISSEMENTS PATHE FRERES, OF PARIS, FRANCE

MEANS FOR ATTACHING LENSES TO CAMERAS

Application filed March 15, 1932, Serial No. 598,912, and in France April 24, 1931.

The mounting of lens upon motor-cameras of standard construction should be rapidly effected, but without prejudice to the accuracy of this mounting nor to the light-tight conditions which are necessary for the camera chamber.

As the lens is attached to a support which is secured to the gate and to the mechanism, an aperture must be provided in the wall of the camera body or box to afford free passage for the lens.

The present invention relates to improvements in motor-cameras which is chiefly characterized by the fact that a suitable device is inserted between the lens and the corresponding aperture in the camera box, which assures absolutely light-tight conditions for the interior of the box while at the same time allowing a certain latitude in the position of the lens with reference to the said box, in order to properly adjust the focus of the lens.

According to another feature of the invention, the said device consists of a baffle ring which is slidable on the main body of the lens and whose outer surface comprises an annular groove adapted for the insertion of the edge of the aperture formed in the camera box and its cover.

In the accompanying drawing which is given solely by way of example:

Fig. 1 is a vertical section on the line 1—1 of Fig. 2, showing the lens mounted on the motor-camera, with the baffle ring in place.

Fig. 2 is a corresponding horizontal section, on the line 2—2 of Fig. 1.

Fig. 3 is a like view, with the camera open.

Fig. 4 is a front view of the baffle ring.

Fig. 5 a cross-section of the ring, on a diameter, and

Fig. 6 is a side view of the lens provided with the ring.

The lens, of the usual type, is attached by its base-plate 1 to the lens support 2 which is secured to the mechanism of the motor-camera. A ring 4 (Figs. 4 and 5) is slidable on the cylindrical part 3 of the lens body (Figs. 1, 2 and 6), said ring having an internal cylindrical surface and an external groove 6.

In the walls of the motor camera (cover 7 and box 8) is pierced an aperture 9 whose diameter somewhat exceeds that of the internal part of the groove 6 of said ring 4. The said groove has a sufficient width to contain, with a certain play, the combined thicknesses of the box 8 and cover 7, in order that the camera may be opened without any obstruction due to the flanges 10 of the ring 4.

When the said ring has been put in place in the aperture 9 of the camera (Fig. 1), the flanges 10 of the ring 4 now completely close the aperture and prevent all entrance of light through the same.

It should be further noted that the cylindrical parts 11 and 12 of the lens (Figs. 1 and 6) which limit the movement of the ring 4 and have a much larger diameter than the cylindrical part 3 of the lens, also act against leakage of light between the ring 4 and this cylindrical part 3 of the lens body.

In this manner, the essential object, which is to afford light-tight conditions for the camera, is perfectly attained by the use of the ring 4.

Furthermore, the said ring, due to its freedom of motion on the lens, permits to mount this latter upon its support 2 even when the lens and the camera have both reached the extreme limits of size allowed by the manufacture.

The apparatus is very simply mounted in place, and for this purpose the ring 4 is pushed clear back against the cylindrical part 12. The edge of the box 8 enters the groove 6 of the ring; then the ring is slid upon the cylindrical part 3 of the lens, and the base 1 of the lens is secured to the support 2 by two screws or the like.

The lens is now mounted, with the ring 4 in position. The cover 7 can then be closed, and all leakage of light into the box at the point occupied by the lens is prevented.

Obviously, the invention is not limited to the form of construction herein described and represented, this being given solely by way of example.

Having now described my invention what I claim as new and desire to secure by Letters Patent is:

1. In a camera, a box provided with an opening, a lens adapted to extend freely through said opening, and means slidingly mounted on said lens and connected with said box and adapted to cover the space between said lens and said opening, whereby light is prevented from entering said box through said opening.

2. In a camera, a box provided with an opening, a lens adapted to extend freely through said opening, at least one flange slidingly mounted on said lens and connected with said box and adapted to cover the space between said lens and said opening, whereby light is prevented from entering said box through said opening.

3. In a camera, a box provided with an opening, a lens adapted to extend freely through said opening, a ring slidingly mounted on said lens in the space between said lens and said opening, and two flanges on said ring on either side of said opening overlapping the edges of said opening, whereby light is prevented from entering said box through said opening.

In testimony whereof I have signed my name to this specification.

ANDRÉ NOËL MERLE.